US005903617A

United States Patent [19]

Kamalski

[11] Patent Number: 5,903,617

[45] Date of Patent: May 11, 1999

[54] METHOD AND SYSTEM FOR PROVIDING SYNCHRONIZATION IN A STREAM OF MESSAGES AND A TRANSMITTER AND A RECEIVER FOR USE IN SUCH A SYSTEM

[75] Inventor: Theodor I.E. Kamalski, Eindhoven, Netherlands

[73] Assignee: U.S. Philips Corporation, New York, N.Y.

[21] Appl. No.: 08/873,257

[22] Filed: Jun. 11, 1997

[30] Foreign Application Priority Data

Jun. 25, 1996 [EP] European Pat. Off. .............. 96201745

[51] Int. Cl.[6] ................................ H04J 3/06; H04L 7/00; H04L 27/00

[52] U.S. Cl. .......................... 375/354; 375/259; 370/350; 370/509

[58] Field of Search .................................... 375/259, 295, 375/316, 354, 362, 365, 366; 370/324, 350, 503, 509, 512–514; 327/141; 340/318, 825.14; 348/464, 845.3; 359/158; 365/233; 702/89

[56] References Cited

U.S. PATENT DOCUMENTS

| | | | |
|---|---|---|---|
| 3,838,221 | 9/1974 | Schmidt et al. | 370/324 |
| 5,404,588 | 4/1995 | Henze | 455/186.1 |
| 5,537,408 | 7/1996 | Branstad et al. | 370/473 |
| 5,673,252 | 9/1997 | Johnson et al. | 370/449 |

FOREIGN PATENT DOCUMENTS 0 497 116 5/1992 European Pat. Off. .

*Primary Examiner*—Stephen Chin
*Assistant Examiner*—Jeffrey W. Gluck
*Attorney, Agent, or Firm*—Edward W. Goodman

[57] ABSTRACT

A method and a system for providing synchronization in a stream of messages. In such a method and system, the stream of messages is arranged in fictitious sequences of messages, in which messages of a predetermined type may only occupy a certain number of locations within a sequence. In this way, the messages of the predetermined type are concentrated in a part of the sequence, which allows a receiver to use the time during which the remaining part of the sequence is transmitted for other purposes, such as scanning of the reception band, etc.

11 Claims, 4 Drawing Sheets

METHOD AND SYSTEM FOR PROVIDING SYNCHRONIZATION IN A STREAM OF MESSAGES AND A TRANSMITTER AND A RECEIVER FOR USE IN SUCH A SYSTEM

BACKGROUND OF THE INVENTION

1. Field of the Invention

The invention relates to a method for broadcasting a stream of messages, including messages of a predetermined type.

The invention also relates to a system for transmitting and receiving a stream of messages.

The invention further relates to a transmitter for transmitting a stream of messages, including messages of a predetermined type.

Furthermore, the invention relates to a receiver for receiving a stream of messages, including messages of a predetermined type.

2. Description of the Related Art

Such a method and system are known from "Specification of the radio data system (RDS)", EN50067:1992, by CENELEC, Brussels. The Radio Data System is a system for broadcasting digital RDS data together with an analog signal. This RDS data may comprise several kinds of information, for example, data on the network transmitting the program signal, data on networks linked to the present network for, e.g., traffic information (Enhanced Other Networks), paging data, radio text, etc. In fact, the RDS allows various kinds of data services to be provided to a listener, especially through the newly defined Open Data application, which allows an RDS group type to carry any kind of data service allocated to that group type with a 3A group. Normally, a receiver receiving RDS data is continuously tuned to a particular network (using the AF feature provided by RDS) and is capable of practically continuous reception of RDS data. Sometimes the receiver has to switch over to another tuning frequency, for instance, when the Enhanced Other Network feature, indicated in groups of type 14, signals that traffic information is broadcast on another network. The switch-over may also be used for checking reception quality on other frequencies. During such a switch-over, the receiver cannot receive the RDS data provided at the original frequency to which the receiver was tuned. For example, when a listener is interested in RDS TMC messages, which are provided in group type 8A, the listener may miss some of these RDS TMC messages, which were broadcast at the original frequency during the time the receiver has switched over to another frequency.

SUMMARY OF THE INVENTION

An object of the present invention is to provide a method, wherein switch-over from one frequency to another (and back) is possible without the loss of messages belonging to a data service one likes to receive.

A method according to the invention is characterized in that the messages are arranged in sequences having a predetermined length, wherein messages of a predetermined type are allocated to reserved locations within a sequence, in which the stream of messages further comprises sequence information from which the position in the sequence can be determined.

By defining fictitious sequences within the stream of messages and by locating messages of a predetermined type in reserved locations within a sequence, a receiver is able to determine which messages it needs to receive for a continuous reception of the desired service. During transmission of the other messages, the receiver may be used for other purposes as long as the receiver is in time for reception of the messages transmitted at the reserved locations. By adding sequence information regarding the position of a sequence in the stream of messages, the receiver is able to synchronize itself to the sequences for reception of the messages transmitted at the reserved locations. The reserved locations need not be filled with messages of the predetermined type. However, whenever one or more messages of the predetermined type are present, they are to be placed in (one of) the reserved locations.

An embodiment of the present invention is characterized in that the reserved locations are adjacent in the sequence.

By concentrating the messages of the predetermined type in adjacent reserved locations, the receiver needs only to be tuned for reception of the messages during a continuous time interval when the reserved locations are being broadcast. This leaves a time interval for the duration of the remainder of the sequence for the receiver to perform other duties. It allows, for example, reception of another data service which has its messages concentrated in the remainder of the sequence.

A further embodiment of the present invention is characterized in that the sequence information comprises information on the length of the sequence.

By adding the length of a sequence to the sequence information, it is possible to use variable lengths for these sequences. This increases the flexibility of the method.

A further embodiment of the present invention is characterized in that a message is an RDS group.

The present invention is particular useful in the Radio Data Systems, wherein the messages are RDS groups.

A further embodiment of the present invention is characterized in that the group type of the message carrying the sequence information is 1A.

The present invention can be used in the Open Data Channel, in which data services or Open Data Applications are assigned to specific RDS groups using the RDS 3A group. In the 3A group, sequence information may be added in the third block of the group together with the assignment of an RDS group for the particular data service or Open Data Application. In this way, sequences can be defined for each individual data service.

A further embodiment of the present invention is characterized in that the group type of the message carrying the sequence information is 3A.

In case of RDS Traffic Message Channel messages being transmitted, the 1A group also allows the transmission of such sequence information in one of its variants used for RDS TMC purposes.

BRIEF DESCRIPTION OF THE DRAWINGS

The above object and features of the present invention will be more apparent from the following description of the preferred embodiments with reference to the drawings, wherein.

In the figures, identical parts are provided with the same reference numbers. In the flowchart, a "Y" means that a condition in a block is met, and an "N" means that a condition in the block is not met.

DESCRIPTION OF THE PREFERRED EMBODIMENTS

Figure 2:
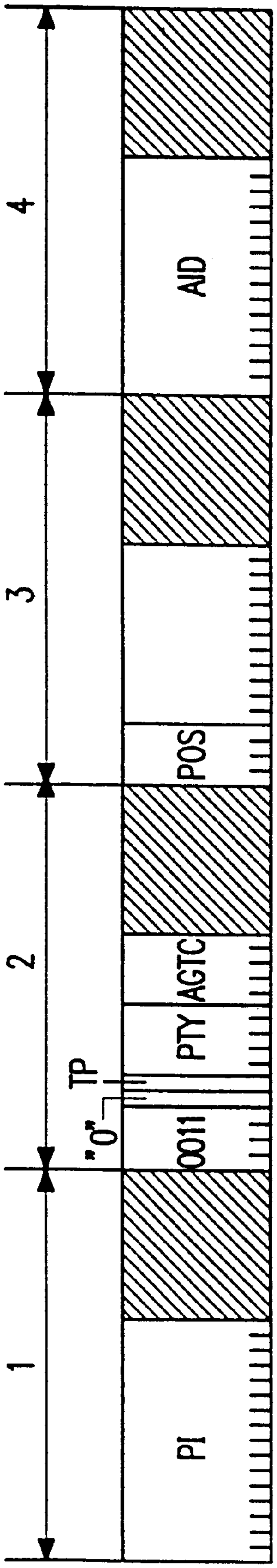
FIG. 2 shows a diagram of an RDS 3A group according to the invention.

The present invention is of particular advantage in the Radio Data System. It can be used for grouping messages belonging to Open Data Applications (ODA), for example, the Traffic Message Channel, in order to avoid missing any messages of such an ODA. In the Open Data Applications, the RDS groups having group type code 3A are used for assigning group type codes to Open Data Applications or data services. For this assignment, the 3A groups need to be transmitted in regular intervals. As shown in FIG. 2, the 3A group comprises, in the first 5 data bits of the second block, a 4-bit group type code of the relevant group type and a bit indicating whether the relevant group is a version-A or version-B group. These 5 bits constitute together the Application Group Type Code (AGTC). In the fourth block of the 3A group, an identification of the Open Data Application or data service is entered, called the AID. The 16 data bits of the third block (not counting checkwords and offsets) are reserved as message bits for the actual Open Data Application. This allows the use of at least a part of these bits for the sequence information, which may be in the form of the actual location of the 3A group within a sequence. If, for example, the length of this sequence is 16 groups, only 4 bits are needed to indicate this position. A number of the remaining bits may be used to represent the length of the sequence if a variable length is allowed. When each sequence is to have a variable length, a special message indicating this fact should be provided in each sequence. If a fixed-length sequence is used or if the sequence is varied only occasionally (i.e., not with every sequence), then the special group only needs to be inserted now and again to allow a receiver to synchronize to the (newly defined) sequences after starting to receive the RDS messages. In this case, the normal repetition rate of the 3A group should be sufficient for practical purposes.

The present invention will now be further elucidated by way of an example relating to the Traffic Message Channel in the Radio Data System. In this example, the assumption is made that the TMC data service is present in 8A (or Open Data channel TMC) groups and that fictitious sequences have been defined at the transmitter side, having a length of 16 messages of which the last 11 messages may not comprise any 8A groups. This means that the first 5 messages may comprise TMC messages, although it is not necessary for these groups to contain TMC messages. Thus, any TMC messages to be transmitted will be grouped together. This allows a receiver to perform switch-overs to other frequencies during the time that the 11 other groups are transmitted without the risk of missing any TMC messages. Other duties can also be performed during this time. It is even possible to use this time interval to switch off (a part of) the receiver in order to reduce power consumption. If no sequences are present in the sequence of messages, a receiver will not know when a TMC message can be expected. This means that a switch-over may result in the loss of TMC messages which are transmitted during the time of the switch-over. The invention can also be used for Open Data Applications as presently proposed for the RDS standard, other than TMC.

Figure 1:
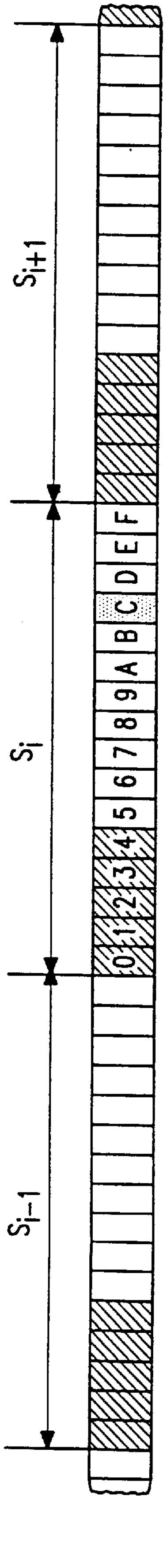
FIG. 1 shows a diagram of a sequence of messages according to the invention.

FIG. 1 shows a diagram of a stream of messages according to the invention. Each square in the diagram indicates a message. In the stream of messages, sequences $S_{i-1}$, $S_i$ and $S_{i+1}$, may be identified, each containing 16 messages. A sequence comprises 5 shaded squares followed by 11 light squares, each square representing a time slot or message. The shaded squares indicate time slots which may be occupied by TMC messages. The 16 time slots or messages of sequence $S_i$ are numbered using hexadecimal notation. The dark square at position C in sequence $S_i$ has a special meaning which will be dealt with later on. The light squares indicate time slots or messages which should not be TMC messages. This means that the receiver only needs to read the first five messages of each sequence in order to avoid missing any TMC messages. During the transmission of the following 11 messages, the receiver does not need to receive these messages if the user is not interested in messages other than TMC messages, and the receiver can be tuned safely to other frequencies during this time. The receiver may use this interval, for example, to receive another data service which may be organized in a similar way. As long as the receiver returns in time to the original frequency where the stream with TMC messages can be received, i.e., before the start of the next sequence, all TMC messages can be received. In order for the receiver to be able to synchronize with such sequences, information should be provided in the stream of messages, from which information the position, e.g., start or end of a sequence, can be determined. This can be done in a number of ways, for example, by insertion of a special message at the start or at the end of a sequence. If it is not possible to insert such a special message at such fixed locations in the stream of messages, these messages may also be inserted at random locations in the stream. If such a special message contains information on its location within a sequence, a receiver can still determine, on the basis of this information, where a sequence begins and where it ends. This information may be the actual location of the message within a sequence, or its distance from the start or end of a sequence or the distance from the previous or next group of messages which may comprise RDS TMC messages. The sequence $S_i$ in FIG. 1 comprises, in the 13th group, a message comprising such information. This message is indicated by a dark square at position C, and is an RDS 3A group comprising information on the TMC data service, and further comprising information for determining the start or end of the sequence. It may even comprise information on the length of the sequence.

FIG. 2 shows a diagram of an RDS 3A group according to the invention. An RDS group comprises four blocks 1 . . . 4. The shaded parts of the blocks comprise checkwords and offsets, which are further described in the RDS standard EN50067:1992, titled: "Specification of the radio data system (RDS)", and are not considered in the following description. The first block comprises a program identification code PI, the second block comprises a 4-bit group type code, followed by 1 bit indicating whether the group is a version-A or B group, followed by a Traffic Program bit TP and a Program TYpe code PTY. The last 5 free bits of the second block 2 and the 16 bits of both blocks 3 and 4 are free for data, resulting in 37 free data bits. For a 3A group, the first 5 bits of the second block are "00110" as indicated in FIG. 2. The application identification for Open Data is put in the 37 data bits. The remaining 5 data bits in the second block comprise the Application Group Type Code, which is, for an 8A group, equal to "01000" (the last bit indicating that it is a version-A group). The 16 data bits of the fourth block 4 comprise an Application IDentifier, indicating the Application or data service carried in the groups having the group type code and version indicated by the AGTC. The 16 data bits of the third block 3 are reserved for the actual Open Data Application. In FIG. 2, the first 4 bits are reserved for indicating the position POS of the 3A group in a fictitious sequence of 16 messages. The number of bits reserved for POS depends, of course, on the length of the sequence. When a sequence of variable length is allowed, a number of the remaining 12 bits in the third block 3 may be reserved to indicate the actual length of the sequence. It is possible that the sequence information is not present in all variants of the 3A groups addressing TMC. Furthermore, it is possible that the sequence information is not present in all variants of the 3A groups addressing TMC, because of a need to provide more information on the Open Data Application (in this case TMC). The position of POS within the 16 data bits is then dependent on the availability of locations within the 16 bits and can, of course, be chosen freely. This means that the location of POS as shown in FIG. 2 should only be seen as an example. As an alternative of the 3A group, the 1A group has a TMC variant, which may also be used for conveying the sequence information. This variant is indicated in the third block with the second, third and fourth bit being "001". Now 12 bits are available in this third block for the sequence information. It is also possible to use other variants of the 1A group for this purpose, as not all variants indicated by the second, third and fourth bit of the third block have been defined. So far, only sequences have been discussed having a fixed length. It is also possible to use sequences of which the predetermined length may vary from sequence to sequence or from blocks of sequences to other blocks of sequences. For this purpose, the special message may comprise information from which not only the start or the end of the sequence can be determined, but also its length. This information may be the actual length of the sequence or the distance of the location of the special message from the start and the end of the sequence, etc.

Figure 3:
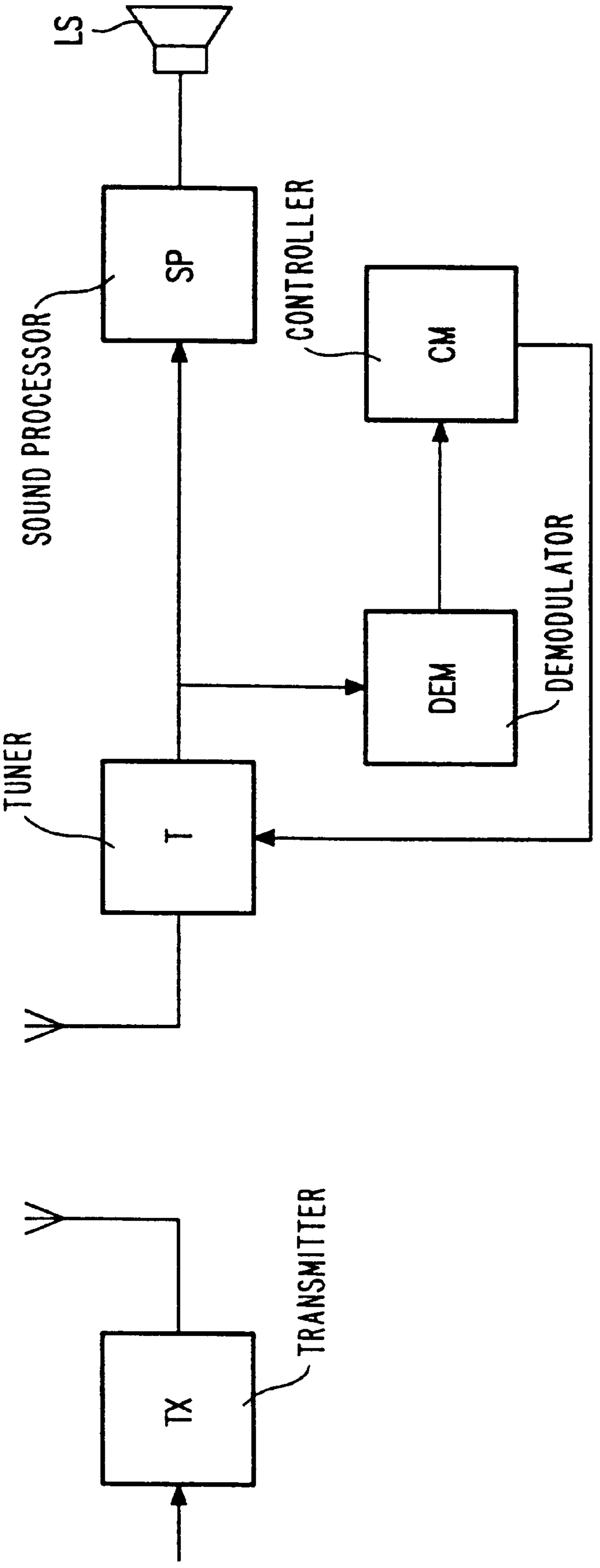
FIG. 3 shows a diagram of a system according to the invention.

FIG. 3 shows a diagram of a system according to the invention. The system comprises at least one transmitter TX and at least one receiver. The transmitter TX is arranged for arranging incoming messages into a stream of messages, this stream comprising sequences of messages. These sequences have a predetermined length. Messages of a predetermined type, e.g., RDS TMC messages, may only be present in the reserved locations within the sequence. These reserved locations are the shaded squares in the sequences of FIG. 1. The transmitter TX is further arranged to provide sequence information to the stream of messages. This is done by inserting 3A groups in the stream of messages. These 3A groups comprise information on the RDS TMC service, together with the actual position of the 3A group in a sequence, as explained in connection with FIG. 1. From this sequence information, a receiver can determine the start or end of such a sequence. The receiver in FIG. 3 comprises an antenna ANT and tuning means T coupled to the antenna ANT for receiving a broadcast signal modulated with an analog modulation signal together with an RDS data signal modulated on a subcarrier of 38 kHz. The tuning means T supplies the decoded modulation, comprising the analog signal and the 38 kHz subcarrier modulated with RDS data, to sound processing means SP for processing the analog signal, and to an RDS demodulator DEM for supplying the RDS data to control means CM. A loudspeaker LS is coupled to the sound processing means SP for reproducing the demodulated analog signal. The control means CM is coupled to the tuning means T for tuning the receiver to a desired frequency for reception of a selected broadcast signal. The control means CM is arranged for receiving a stream of demodulated RDS messages or groups. The control means CM is further arranged to retrieve, from a received 3A group, the sequence information, and to synchronize the receiver to the sequences. The control means CM are usually implemented in software using a microcontroller and one or more memories for storing the software and data.

Figure 4:
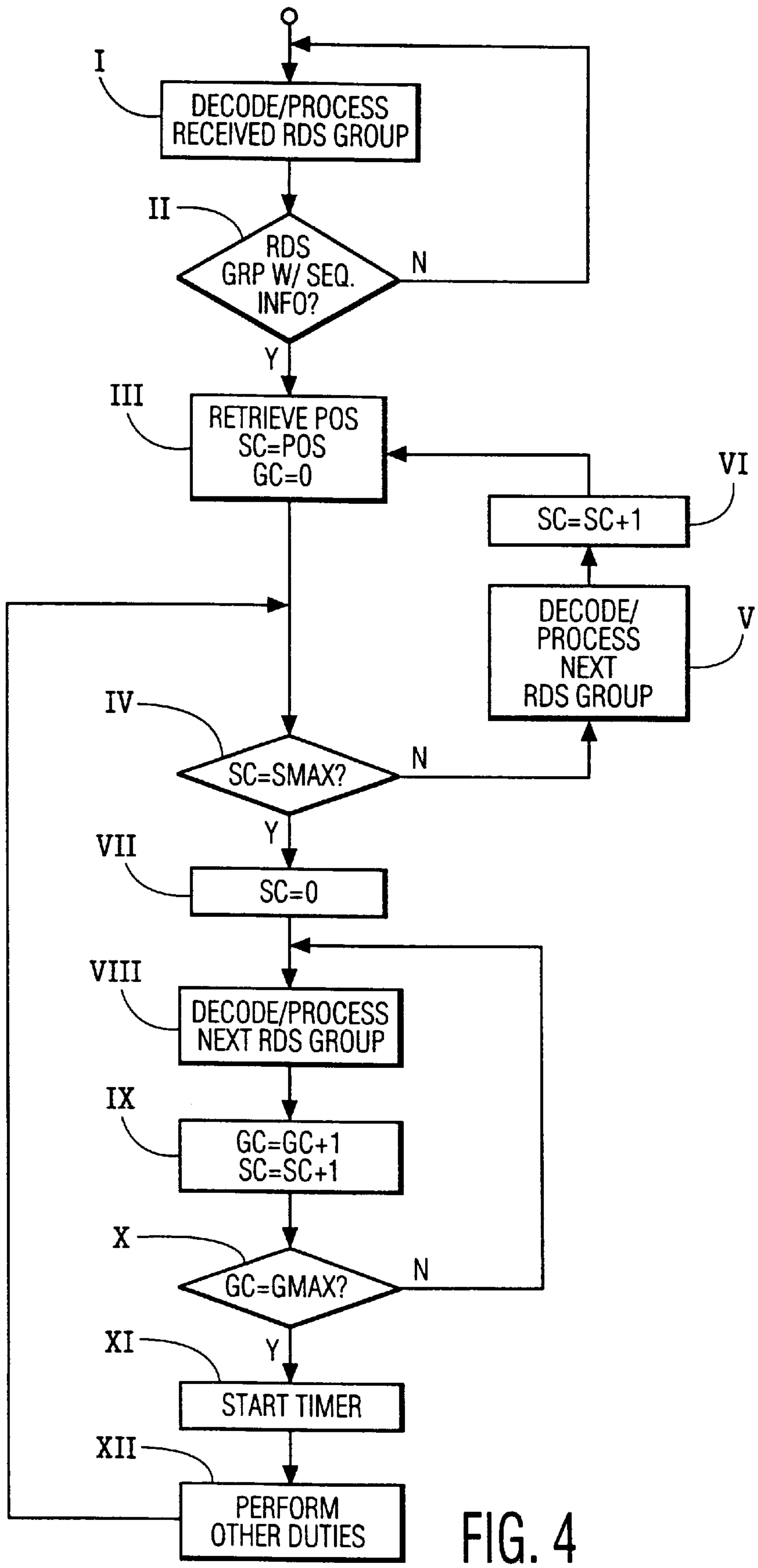
FIG. 4 shows a flowchart of an algorithm for use in a receiver according to the invention.

FIG. 4 shows a flowchart of an algorithm for use in the receiver according to the invention. At the start of the flowchart, it is assumed that the receiver has recently tuned to the desired frequency. In Table 1, a short description is given of each of the blocks in the flowchart of FIG. 4.

TABLE 1

DESCRIPTION OF THE BLOCKS IN FIG. 4.

| BLOCK | DESCRIPTION |
|---|---|
| I | Decode and process received RDS group |
| II | Is received group a 3A group comprising sequence information? |
| III | Retrieve position POS from 3A group, set SC = POS and GC = 0 |
| IV | SC = SMAX? |
| V | Decode and process next RDS group |
| VI | SC = SC + 1 |
| VII | SC = 0 |
| VIII | Decode and process next RDS group |
| IX | GC = CG + 1, SC = SC + 1 |
| X | GC = CMAX? |
| XI | Start timer (increase SC at regular intervals) |
| XII | Perform other duties |

In block I, the receiver starts to decode and process an incoming RDS message. The receiver checks, in block II, if a 3A group has been received, comprising information on TMC, such as AGTC, AID and also the position of the 3A group within a sequence. If no such group has been received, the receivers returns to normal reception of RDS messages in block I. If the appropriate RDS group has been received, then, in block III, the receiver retrieves the position of the 3A group within a sequence. This position is indicated by POS. Now a sequence counter SC is set to this value POS. The sequence counter SC counts the number of groups in a sequence and is reset after reaching the value SMAX. The group counter GC counts the number of received groups in the reserved locations and is reset after reaching its maximum value of GMAX. The value SMAX is set in this example at 16 and the value GMAX is set at 5 as there are only 5 adjacent reserved locations which may comprise RDS TMC messages and, consequently, 11 free locations in the sequence which may not comprise TMC messages. The loop consisting of blocks IV, V and VI is for synchronizing the receiver to the start of a sequence. In block V, the next RDS group is decoded and processed and in block VI the counter SC is increased by 1. When, in block IV, it is established that the sequence counter has reached its maximum value, which means that the last message in a sequence has been received, the receiver is synchronized with the sequences present in the incoming stream of RDS groups. Now, the sequence counter SC and the group counter GC are set to 0 in block VII. Now, blocks VIII, IX and X constitute another loop for receiving and keeping track of the reserved locations within the sequence, these reserved locations being present at the start of the sequence. The number of reserved locations is equal to GMAX. In block VIII, the next RDS group is decoded and processed, and in block IX, the sequence counter SC is increased by 1. These two blocks are repeated until, in block X, a condition is fulfilled. This condition is that counter GC equals GMAX. When counter GC has reached this value, this indicates that all reserved locations have been received. It further indicates that the receiver is now free for the remainder of the sequence to perform whatever duties it needs to perform without risking the loss of any RDS TMC messages, as no TMC messages will be present in the remainder of the sequence. However, the receiver needs to resume reception of the RDS messages before the end of the sequence in order to receive the reserved locations in the next sequence. For this purpose, a timer is started in block XI. Now the receiver may perform other duties in block XII until the timer reaches a value corresponding to a time before, but close to, the end of the sequence. Then, the receiver resumes reception of RDS messages of the original network it was tuned to in blocks I . . . X. The timer may also be used to increase the sequence counter SC automatically. In this way, the sequence counter SC still indicates when the next sequence is about to begin by reaching a value smaller than but close to SMAX or equal to SMAX. Such an increase of the sequence counter SC should take place after each time interval in which an RDS group is transmitted. This flowchart shows a continuing cycle for receiving RDS TMC messages at the original frequency, while the receiver may perform other duties during the time that no TMC messages are broadcast, i.e., during the time that the 11 remaining messages of the sequence are transmitted.

In connection with the Figures, the invention is explained using the RDS TMC messages as example. The RDS TMC need not be present in the 8A groups, but may also occupy other Open Data groups. The invention is not limited to the RDS TMC data service, but may be used in connection with any data service supplied in the Radio Data System. Neither the length of the sequence nor the number of messages which should not contain TMC messages is limited to the amounts given in the examples, but may be chosen freely. It may be clear that a 3A group can be present at any location within a sequence.

The invention can also be used outside the RDS system in other data carrying systems, wherein messages have individual time slots and wherein messages of the same type may be distributed in the stream of messages at arbitrary time slots, but where a concentration of messages of the same type is desired for allowing a receiver to perform other operations during the time in which no messages of said same type are expected. Such systems may be according to the HSDS or DARC standards. Furthermore such systems may comprise FM modulation but also other modulation types.

What is claimed is:

1. A method for broadcasting a stream of messages, including messages of a predetermined type, characterized in that the method comprises the steps of:

arranging the messages in sequences having a predetermined length;

allocating messages of the predetermined type to reserved locations within a sequence, said reserved locations being adjacent in the sequence; and inserting into said stream of messages, sequence information for enabling determining the position of the sequence.

2. The method of claim 1, characterized in that the sequence information comprises information on the length of the sequence.

3. The method of claim 1, characterized in that said method further comprises the step of reserving a message within at least one sequence for carrying the sequence information.

4. The method of claim 1, characterized in that a message is an RDS group.

5. The method of claim 4, characterized in that a message of the predetermined type is a TMC message.

6. The method of claim 5, characterized in that the group type of the message carrying the sequence information is 1A.

7. The method of claim 5, characterized in that the group type of the message carrying the sequence information is 3A.

8. The method of claim 4, characterized in that the group type of the message carrying the sequence information is 3A.

9. A transmitter for transmitting a stream of messages, including messages of a predetermined type, characterized in that the transmitter is arranged for providing synchronization in the stream of messages and comprises:

means for arranging the messages in sequences of a predetermined length;

means for allocating messages of the predetermined type to reserved locations within a sequence, said reserved locations being adjacent in the sequence; and means for providing sequence information to the stream of messages, a position of a sequence being determinable from said sequence information.

10. A receiver for receiving a stream of messages, including messages of a predetermined type, characterized in that the stream of messages provides for stream synchronization by:

having messages arranged in sequences of a predetermined length;

having messages of the predetermined type allocated to reserved locations within the sequence; and having sequence information provided in the stream of messages, a position of the sequence being determinable from said sequence information, wherein the receiver comprises:

means for retrieving sequence information from the stream;

means for synchronizing the receiver to the sequences provided in the stream;

means for discontinuing reception of the stream of messages during a first time interval in each sequence in which no reserved locations are broadcast; and means for resuming reception and processing of messages during a second time interval in each sequence in which messages at the reserved locations are broadcast.

11. A system for transmitting and receiving a stream of messages, said system comprising a transmitter having means for modulating said stream of messages on a subcarrier wave, and means for modulating said modulated subcarrier wave and an analog broadcast signal onto a broadcast carrier wave, and a receiver having means for tuning to said broadcast carrier wave, and means for demodulating said modulated subcarrier wave in order to retrieve said stream of messages, wherein the stream is arranged such that the stream comprises sequences of messages including messages of a predetermined type, said sequences having a predetermined length, and said messages of a predetermined type being allocated to predetermined locations within a sequence, said predetermined locations being adjacent in the sequence, and wherein the stream further comprises sequence information for determining a position of a sequence in the stream of messages.

* * * * *